United States Patent
Borlick et al.

(10) Patent No.: US 10,834,188 B2
(45) Date of Patent: Nov. 10, 2020

(54) DISTRIBUTION OF DATA IN CLOUD STORAGE BASED ON POLICIES MAINTAINED IN METADATA

(71) Applicant: INTERNATIONAL BUSINESS MACHINES CORPORATION, Armonk, NY (US)

(72) Inventors: Matthew G. Borlick, Tucson, AZ (US); Lokesh M. Gupta, Tucson, AZ (US); Micah Robison, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 99 days.

(21) Appl. No.: 15/078,185

(22) Filed: Mar. 23, 2016

(65) Prior Publication Data
US 2017/0279890 A1  Sep. 28, 2017

(51) Int. Cl.
*G06F 15/16* (2006.01)
*H04L 29/08* (2006.01)

(52) U.S. Cl.
CPC .......... *H04L 67/1097* (2013.01); *H04L 67/16* (2013.01)

(58) Field of Classification Search
CPC .............................. H04L 67/1097; H04L 67/16
USPC ......................................................... 709/219
See application file for complete search history.

(56) References Cited

U.S. PATENT DOCUMENTS

| 7,836,509 | B2* | 11/2010 | Yoo ...................... G06F 21/10 726/26 |
| 8,868,905 | B2 | 10/2014 | Davis et al. |
| 9,268,920 | B1 | 2/2016 | Butler et al. |
| 9,356,940 | B2 | 5/2016 | Hanna, Jr. et al. |
| 9,531,533 | B2 | 12/2016 | Ronca |
| 9,641,630 | B2 | 5/2017 | Broussard et al. |
| 9,705,813 | B2 | 7/2017 | Marshall et al. |
| 9,955,308 | B2 | 4/2018 | Baldwin |
| 10,503,912 | B1 | 12/2019 | Kerr |
| 2003/0002637 | A1* | 1/2003 | Miyauchi ................ H04M 3/10 379/93.01 |
| 2004/0133606 | A1* | 7/2004 | Miloushev ........ G06F 17/30091 |
| 2007/0162716 | A1* | 7/2007 | Yagisawa ............ G06F 11/1435 711/162 |
| 2010/0198889 | A1* | 8/2010 | Byers ..................... G06F 3/0605 707/827 |
| 2013/0197401 | A1* | 8/2013 | Sato ........................ A61N 7/00 601/2 |

(Continued)

OTHER PUBLICATIONS

U.S. Appl. No. 15/078,187, filed Mar. 23, 2016.

(Continued)

*Primary Examiner* — Oscar A Louie
*Assistant Examiner* — Oluwatosin M Gidado
(74) *Attorney, Agent, or Firm* — Rabindranath Dutta; Konrad Raynes Davda & Victor LLP (57) ABSTRACT

Provided are a method, a system, and a computer program product in which metadata associated with data is maintained, wherein the metadata indicates whether storage of the data is restricted geographically. A controller receives a request to store the data in cloud storage comprising a plurality of cloud servers located in a plurality of geographical locations. The controller determines where to store the data in the cloud storage, by interpreting the metadata.

18 Claims, 10 Drawing Sheets

(56) References Cited

U.S. PATENT DOCUMENTS

| | | | |
|---|---|---|---|
| 2014/0075493 A1 | 3/2014 | Krishnan et al. | |
| 2016/0156671 A1 | 6/2016 | Cabrera et al. | |
| 2016/0173502 A1 | 6/2016 | Statchuk | |
| 2016/0182529 A1 | 6/2016 | Biehl et al. | |
| 2016/0352834 A1* | 12/2016 | Borowiec | H04L 67/1097 |
| 2016/0357739 A1* | 12/2016 | Rathinagiri | G06F 17/302 |
| 2017/0126698 A1 | 5/2017 | Minkovich et al. | |
| 2017/0279812 A1 | 9/2017 | Borlick et al. | |

OTHER PUBLICATIONS

List of IBM Patents or Patent Applications Treated As Related dated Mar. 23, 2016, pp. 2.
Office Action dated Oct. 9, 2017, pp. 20, for U.S. Appl. No. 15/078,187, filed Mar. 23, 2016.
Response dated Jan. 9, 2018, pp. 9, to Office Action dated Oct. 9, 2017, pp. 20, for U.S. Appl. No. 15/078,187, filed Mar. 23, 2016.
Final Office Action dated Dec. 14, 2018, pp. 23, for U.S. Appl. No. 15/078,187.
Response dated Mar. 14, 2019, pp. 27, to Office Action dated Oct. 9, 2017, pp. 20, for U.S. Appl. No. 15/078,187, filed Mar. 23, 2016.
Office Action dated Oct. 3, 2019, pp. 17, for U.S. Appl. No. 15/078,187.
Response dated Jan. 3, 2020, pp. 27, to Office Action dated Oct. 9, 2017, pp. 20, for U.S. Appl. No. 15/078,187, filed Mar. 23, 2016.
Final Office Action dated May 6, 2020, pp. 18, for U.S. Appl. No. 15/078,187.
Response dated Aug. 6, 2020, pp. 16 to Final Office Action dated May 6, 2020, pp. 18, for U.S. Appl. No. 15/078,187.

* cited by examiner

DISTRIBUTION OF DATA IN CLOUD STORAGE BASED ON POLICIES MAINTAINED IN METADATA

BACKGROUND

1. Field

Embodiments relate to the distribution of data in cloud storage based on policies maintained in metadata.

2. Background

Cloud storage is a model of data storage in which digital data is stored in logical pools, and the physical storage spans a plurality of servers. The physical storage environment may be owned and managed by a hosting company. These cloud storage providers may be responsible for keeping the data available and accessible, and for keeping the physical environment protected and maintained properly. People and organizations may buy or lease storage capacity from the cloud storage providers to store user, organization, or application data.

In certain storage system environments a storage controller may comprise a plurality of storage servers that are coupled to each other, where one or more of the storage servers may comprise a plurality of processing nodes or servers. The storage controller allows host computing systems to perform input/output (I/O) operations with storage devices controlled by the storage controller.

SUMMARY OF THE PREFERRED EMBODIMENTS

Provided are a method, a system, and a computer program product in which metadata associated with data is maintained, wherein the metadata indicates whether storage of the data is restricted geographically. A controller receives a request to store the data in cloud storage comprising a plurality of cloud servers located in a plurality of geographical locations. The controller determines where to store the data in the cloud storage, by interpreting the metadata.

In additional embodiments, in response to determining that the metadata indicates that the storing of the data is allowed in a geographical location where a cloud server is located, the data is stored in the cloud server.

In further embodiments, in response to determining that the metadata indicates that the storing of the data is not allowed in the geographical location where the cloud server is located, the storing of the data is prevented in the cloud server.

In additional embodiments, the data is allowed by law or policy to be stored only in one or more selected geographical locations.

In further embodiments, the data is restricted by law or policy from being stored in one or more selected geographical locations.

In certain embodiments, the data is stored in a first cloud server, based on the interpreting of the metadata. A determination is made that a remote copy is to be made of the data stored in the first cloud server. A determination is made of a second cloud server in which the remote copy is allowed to be stored, based on the metadata. Subsequent to the determination of the second cloud server, the remote copy of the data is performed to the second cloud server.

In additional embodiments, the metadata indicates one or more geographical locations in which the storing of the data is allowed, and one or more geographical locations in which the storing of the data is not allowed.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

In certain situations, privacy and security of data have to be maintained to conform to corporate policies, customer preferences, and government policies, or for other reasons. For example, certain health related data of individuals may only be stored in the country in which the patient resides. Corporate policies may dictate that employee data be stored within the firewall of the corporation. There may be prohibitions on certain data crossing national boundaries. Additionally, there may be restrictions on who can access the data and such restrictions may dictate where the data is stored. If data is stored in cloud storage, such privacy and security of data have to be maintained.

Certain embodiments store data in cloud storages distributed in a plurality of geographical locations, where the distribution of data in the cloud storages conform to laws and policies that are maintained in metadata associated with the data. In certain embodiments, the metadata indicates one or more geographical locations in which the storing of the data is allowed, and one or more geographical locations in which the storing of the data is not allowed.

Exemplary Embodiments

Figure 1:
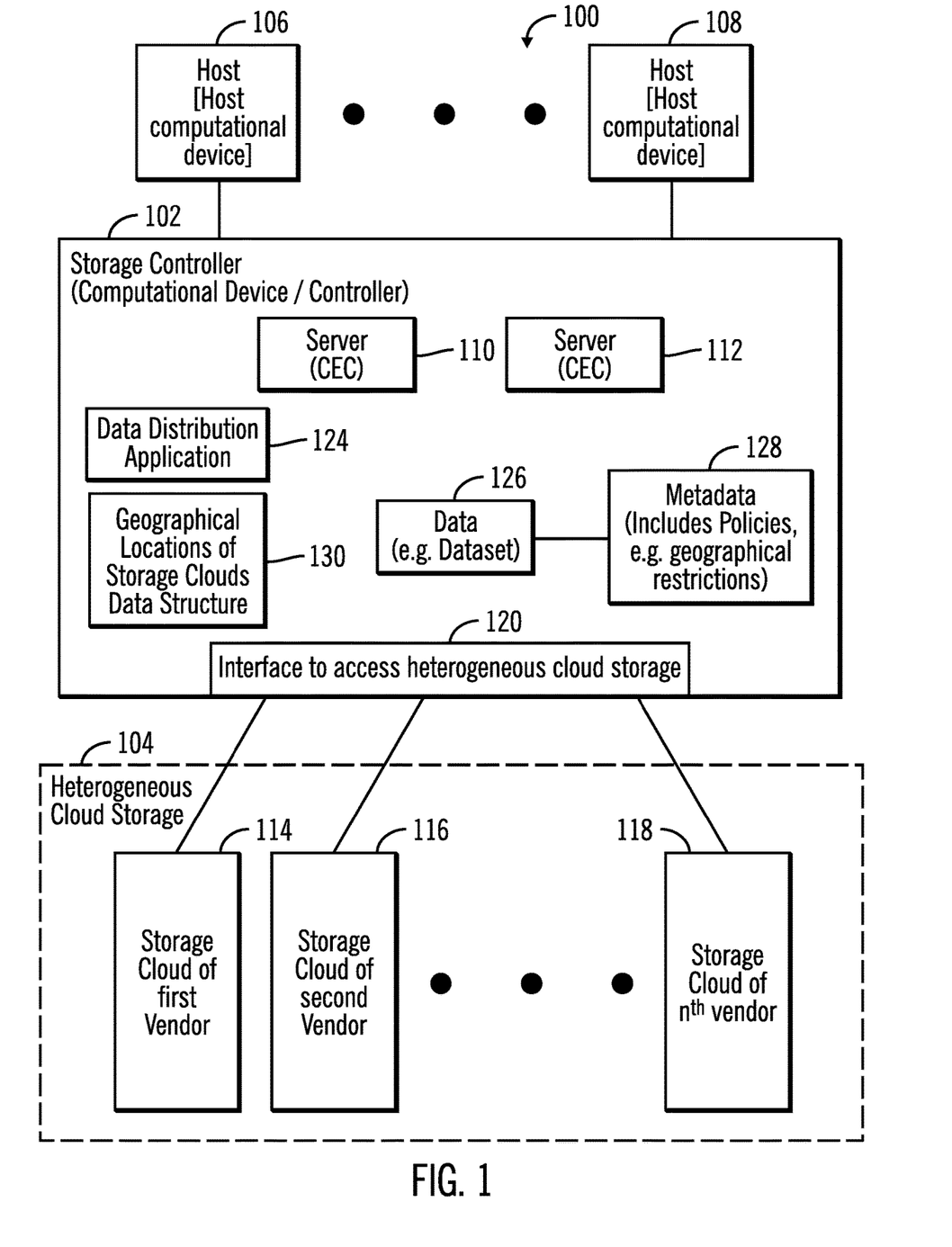
FIG. 1 illustrates a block diagram of a computing environment comprising a storage controller coupled to a heterogeneous cloud storage comprising storage clouds distributed over a plurality of geographical locations, in accordance with certain embodiments.

FIG. 1 illustrates a block diagram of a computing environment 100 comprising a storage controller 102 coupled to a heterogeneous cloud storage 104 comprising storage clouds distributed over a plurality of geographical locations, in accordance with certain embodiments. The storage controller 102 allows a plurality of hosts 106, 108 (e.g., host computational devices) to perform input/output (I/O) operations with logical storage maintained by the storage controller 102. The physical storage corresponding to the logical storage is found in the heterogeneous cloud storage 104.

The storage controller 102 comprises a plurality of server computational devices 110, 112. The server computational devices 110, 112 may also be referred to as servers or central electronic complexes (CEC) or processor complexes. The storage controller 102 may comprise a set of hardware that includes central processing units (CPU), memory, channels, controllers, etc. The servers 110, 112 of the storage controller 102, the storage controller 102, and the hosts 106, 108 may comprise any suitable computational device including those presently known in the art, such as, a personal computer, a workstation, a server, a mainframe, a hand held computer, a palm top computer, a telephony device, a network appliance, a blade computer, a processing device, etc. The servers 110, 112, the storage controller 102, and the hosts 106, 108 may be elements in any suitable network, such as, a storage area network, a wide area network, the Internet, an intranet. In certain embodiments, the servers 110, 112 may function redundantly and one server may be able to take over the operations of the other server. In certain embodiments, the servers 110, 112 of the storage controller 102, the storage controller 102, the hosts 106, 108, and the heterogeneous cloud storage 104 may be elements in a cloud computing environment that comprises the computing environment 100.

The heterogeneous cloud storage 104 may be comprised of a plurality of storage clouds 114, 116, 118 where each of the plurality of storage clouds may be provided and maintained by a different entity, and where each of the plurality of storage clouds may be maintained in different geographical locations. For example, a first vendor may provide the storage cloud 114, a second vendor may provide the storage cloud 116, and a third vendor may provide the storage cloud 118. The different storage clouds 114, 116, 118 may be placed at different geographical locations separated by a considerable distance, such as at least 10 kilometers, or for that matter in different countries or continents.

Each storage cloud 114, 116, 118 may be comprised of a plurality of storage devices, such as storage disks, tape drives, solid state storage, etc., that are maintained by a storage server (referred to as a cloud server) that has an operating system. In certain embodiments, the storage cloud 114 maintained by the first vendor may be in a first geographical location and may have one operating system, whereas the storage cloud 116 maintained by the second vendor may be in a second geographical location and may have another operating system.

The storage controller 102 may have an interface 120 to access the heterogeneous cloud storage 104. Additionally, a data distribution application 124 that distributes data 126 in different storage clouds in the heterogeneous cloud storage 104 may execute in the storage controller 102. The data distribution application 124 may be implemented in software, firmware, or hardware, or any combination thereof, in accordance with certain embodiments.

The storage controller 102 may maintain metadata 128 associated with the data 126. The metadata 128 may include policies and geographical restrictions associated with the storage and access of the data in the heterogeneous cloud storage 104. The storage controller 102 may also maintain a data structure 130 that maintains the geographical locations of the storage clouds 114, 116, 118.

The data distribution application 124 may use the data structure 130 that maintains the geographical locations of storage clouds 114, 116, 118 and the metadata 128 that includes policies and geographical restrictions associated with the storage and access of the data 126 (e.g., a dataset), to determine the storage cloud in which to physically store the data 126.

Figure 2:
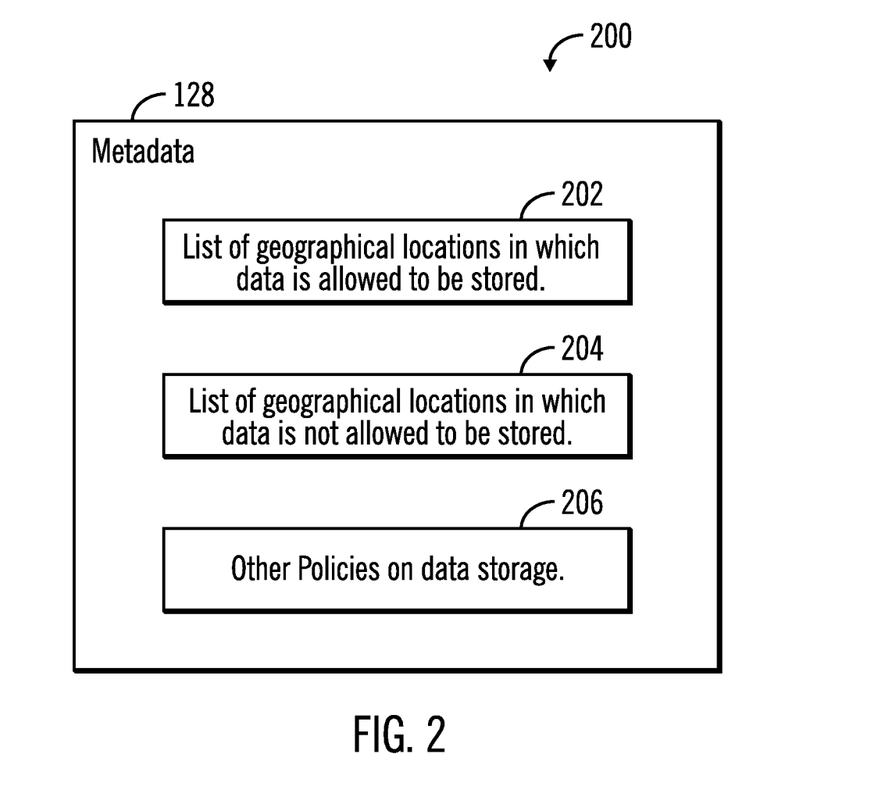
FIG. 2 illustrates a block diagram that shows metadata indicating permitted geographical locations for storage of data, in accordance with certain embodiments.

FIG. 2 illustrates a block diagram 200 that shows the metadata 128 indicating permitted geographical locations for storage of data, in accordance with certain embodiments. In certain embodiments, the metadata 128 associated with the data 126 may indicate a list of geographical locations in which the data 126 is allowed to be stored (shown via reference numeral 202). The metadata 128 may also indicate a list of geographical locations in which the data 126 is not allowed to be stored (shown via reference numeral 204). Other policies on data storage (shown via reference numeral 206) may also be stored in the metadata 128. For example, the other policies may indicate that that the data 126 may be stored in selected geographical locations only till a certain date, or for a particular period of time. The other policies may also indicate who has access to the data.

Figure 3:
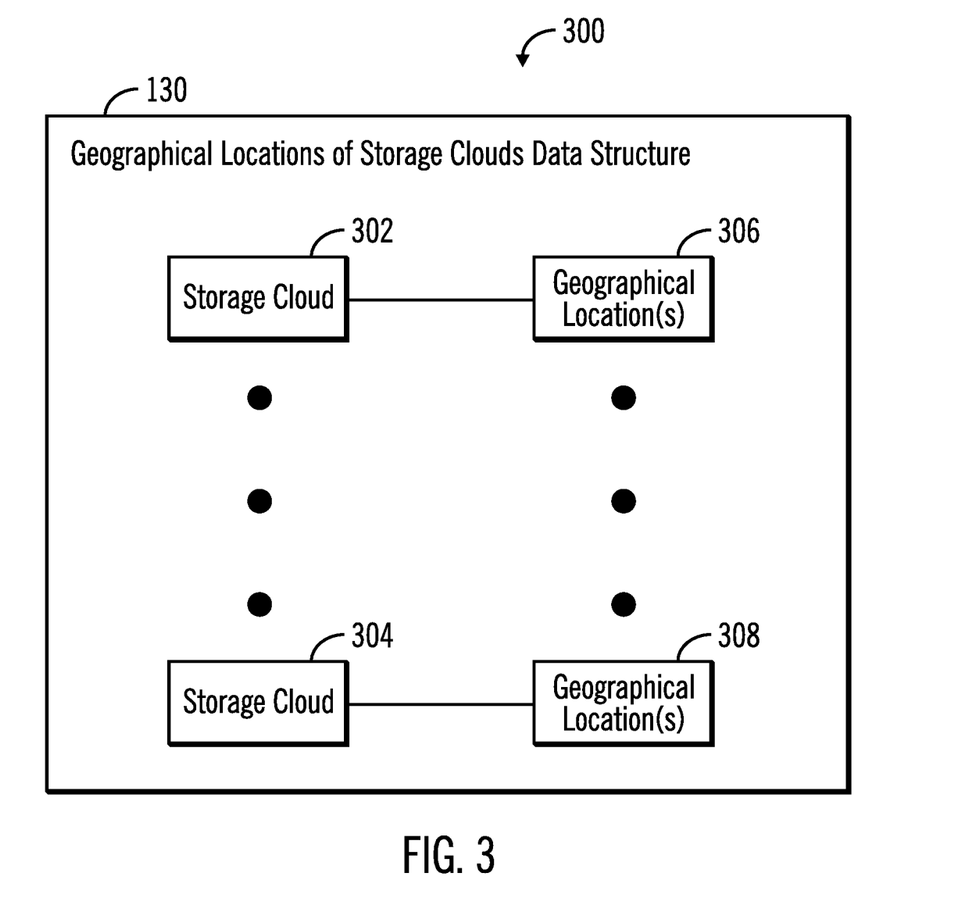
FIG. 3 illustrates a block diagram that shows storage clouds in a plurality of geographical locations, in accordance with certain embodiments.

FIG. 3 illustrates a block diagram 300 that shows storage clouds in a plurality of geographical locations, in accordance with certain embodiments. For example, in certain embodiments, the "geographical locations of storage clouds data structure" 130 that is maintained in the storage controller 102 may indicate that the storage cloud 302 is located in geographical location 306 (e.g., Germany), and that the storage cloud 304 is located in geographical location 308 (e.g., United States of America). The storage clouds 302, 304 may correspond to the storage clouds 114, 116, 118 shown in FIG. 1.

Figure 4:
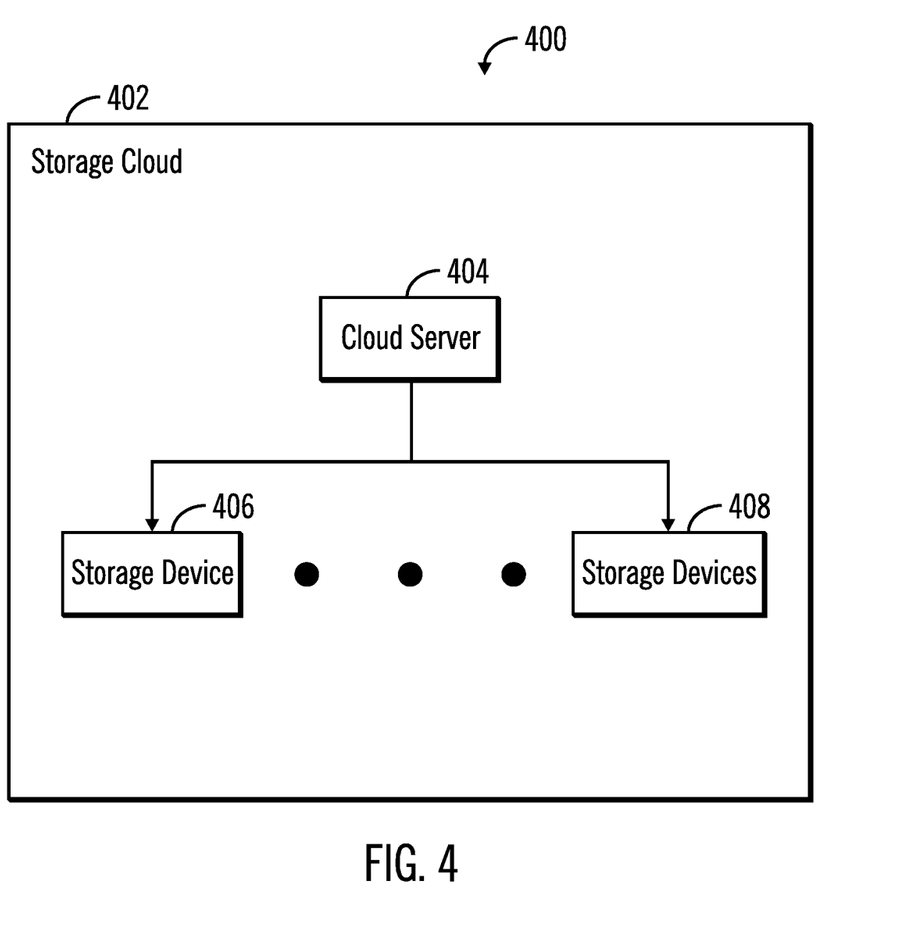
FIG. 4 illustrates a block diagram that shows a storage cloud comprised of a cloud server and a plurality of storage devices coupled to the cloud server, in accordance with certain embodiments.

FIG. 4 illustrates a block diagram 400 that shows a storage cloud 402 comprised of a cloud server 404 and a plurality of storage devices 406, 408 coupled to the cloud server 404, in accordance with certain embodiments. The cloud server 404 may comprise any suitable computational device including those presently known in the art, such as, a personal computer, a workstation, a server, a mainframe, a hand held computer, a palm top computer, a telephony device, a network appliance, a blade computer, a processing device, etc. The storage devices 406, 408 may comprise any suitable storage device comprising a disk drive, a tape drive, an optical drive, a solid state drive, etc. The storage cloud 402 may correspond to any of the storage clouds 114, 116, 118 shown in FIG. 1.

Figure 5:
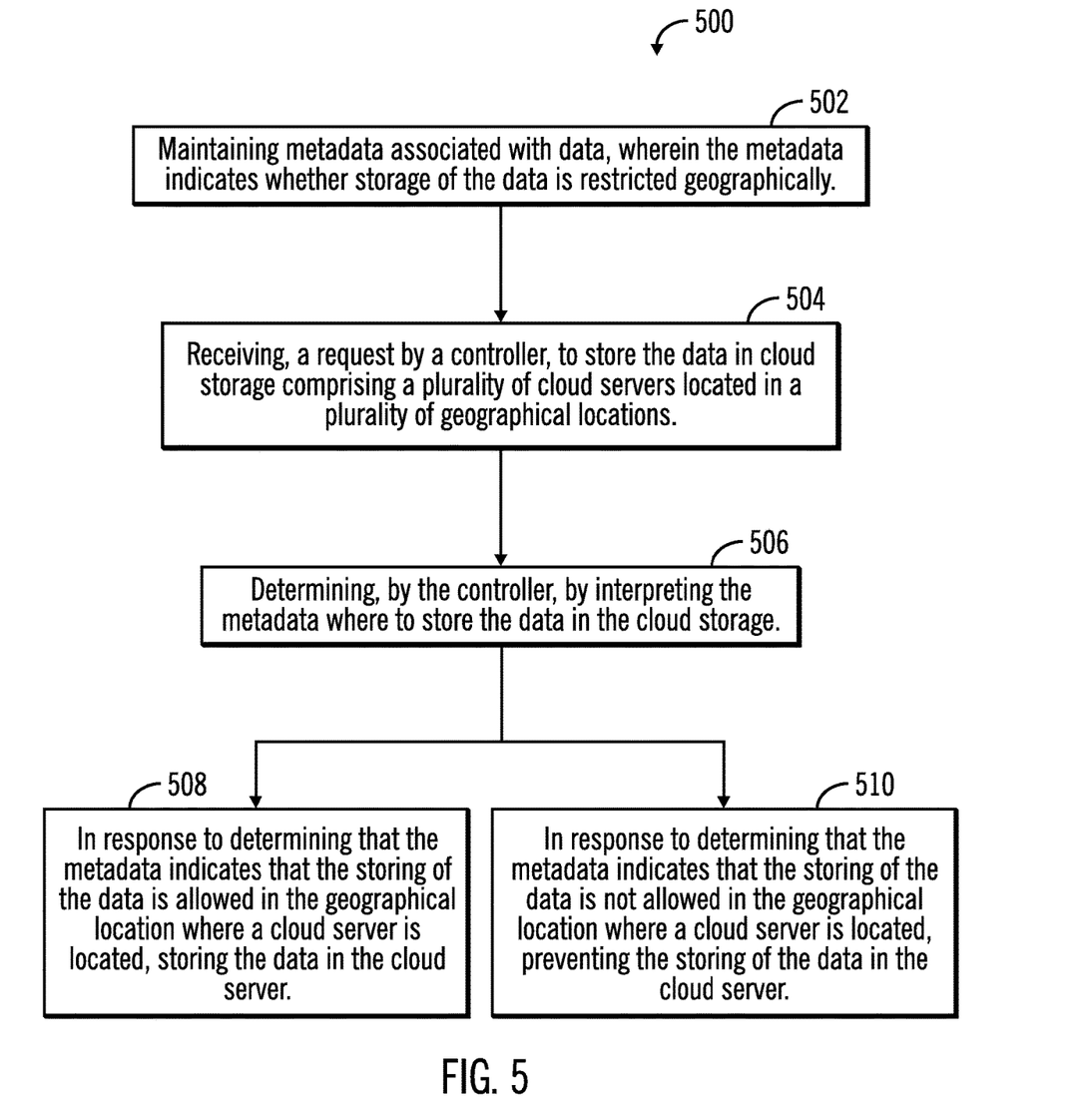
FIG. 5 illustrates a first flowchart that shows storage of data in cloud servers based on policies indicated in metadata associated with data, in accordance with certain embodiments.

FIG. 5 illustrates a first flowchart 500 that shows storage of data 126 in cloud servers based on policies indicated in metadata 128 associated with the data 126, in accordance with certain embodiments. The operations shown in FIG. 5 may be performed at least by the data distribution application 124 that executes in the storage controller 102.

Control starts at block 502 in which metadata 128 associated with data 126 is maintained, wherein the metadata 128 indicates whether storage of the data is restricted geographically. A controller 102 (e.g., storage controller 102) receives (at block 504) a request to store the data 126 in cloud storage 104 comprising a plurality of cloud servers located in a plurality of geographical locations. The request may be generated by an application, process or task executing internally within the controller 102 or may be received from one or more of the hosts 106, 108. The data distribution application 124 that executes in the controller 102 determines (at block 506) by interpreting the metadata 128 where to store the data in the cloud storage 104.

From block 506 control proceeds in parallel to block 508 and 510. At block 508, in response to determining that the metadata 128 indicates that the storing of the data is allowed in the geographical location where a cloud server is located, the data is stored by the data distribution application 124 in the cloud server that may be located in one of the storage clouds 114, 116, 118.

At block 510, in response to determining that the metadata 128 indicates that the storing of the data is not allowed in the geographical location where a cloud server is located, the storing of the data is prevented in the cloud server by the data distribution application 124.

Therefore, FIG. 5 illustrates certain embodiments in which a data distribution application 124 that executes in a storage controller 102 stores data 126 in a cloud server of a storage cloud, based on geographical restrictions and/or policies indicated in metadata 128 associated with the data 126.

Figure 6:
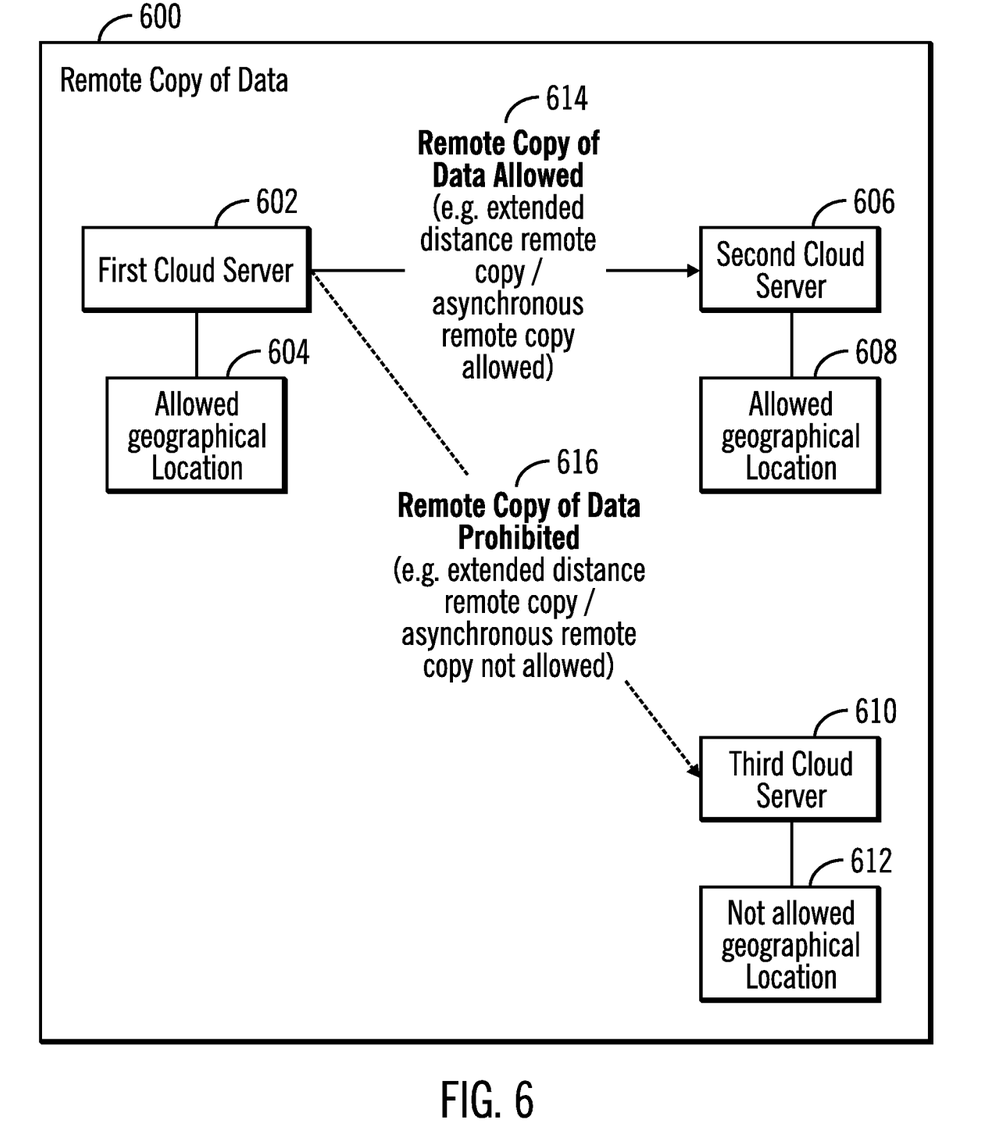
FIG. 6 illustrates a block diagram that shows remote copying of data from one cloud server to another, in accordance with certain embodiments.

FIG. 6 illustrates a block diagram 600 that shows remote copying of data from one cloud server to another, in accordance with certain embodiments. In FIG. 6, a first cloud server 602 stores data in an allowed geographical location 604 for the data, based on indications included in metadata associated with the data.

A second cloud server 606 is located in an allowed geographical location 608 for the data, and a third cloud server 610 is located in a not allowed geographical location 612 for the data. As a result, the remote copying of data (e.g., an extended distance remote copy, an asynchronous remote copy, etc.) is allowed from the first cloud server 602 to the second cloud server 606 (as shown via reference numeral 614). However, the remote copying of data from the first cloud server 602 to the third cloud server 610 is prohibited (as shown via reference numeral 616).

Figure 7:
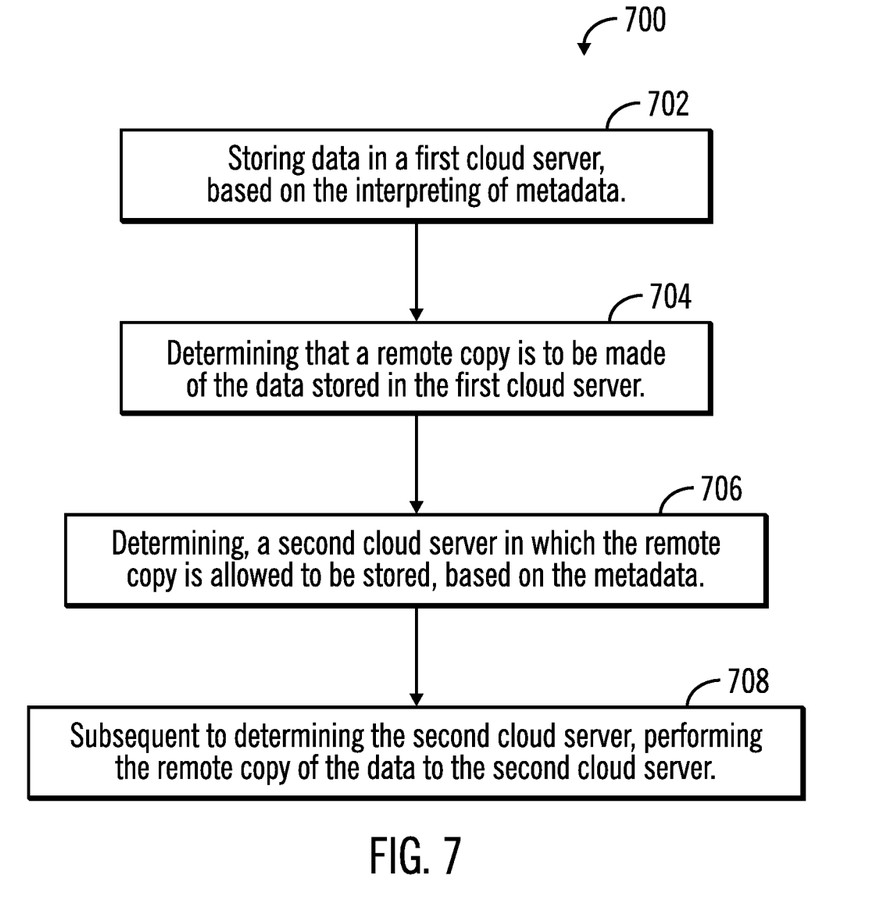
FIG. 7 illustrates a second flowchart that shows remote copying of data from one cloud server to another, in accordance with certain embodiments.

FIG. 7 illustrates a second flowchart 700 that shows remote copying of data from one cloud server to another, in accordance with certain embodiments. The operations shown in FIG. 7 may be performed at least by the data distribution application 124 that executes in the storage controller 102.

Control starts at block 702 in which data is stored in the first cloud server 602, based on interpreting the metadata for the data. The storage of the data in the first cloud server 602 may be as a result of operations shown in FIG. 5.

Control proceeds to block 704 in which a determination is made that a remote copy is to be made of the data stored in the first cloud server 602. A determination is made (at block 706) of a second cloud server 606 in which the remote copy is allowed to be stored, based on the metadata that shows the list of geographical locations in which the data is allowed to be stored and the list of geographical locations in which the data is not allowed to be stored (as shown in FIG. 2).

Subsequent to the determination of the second cloud server 606, the remote copy of the data is performed (at block 708) to the second cloud server 606.

Therefore, FIGS. 1-7 illustrate certain embodiments in which based on indications provided in metadata associated with data, the data is initially stored in permitted geographical locations, and subsequently remote copy operations of the stored data are also made to permitted geographical locations based on indications stored in the metadata. As a result, privacy and security of the data is maintained in embodiments in which the data is allowed by law or policy to be stored only in one or more selected geographical locations, and the data is restricted by law or policy from being stored in one or more selected geographical locations.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
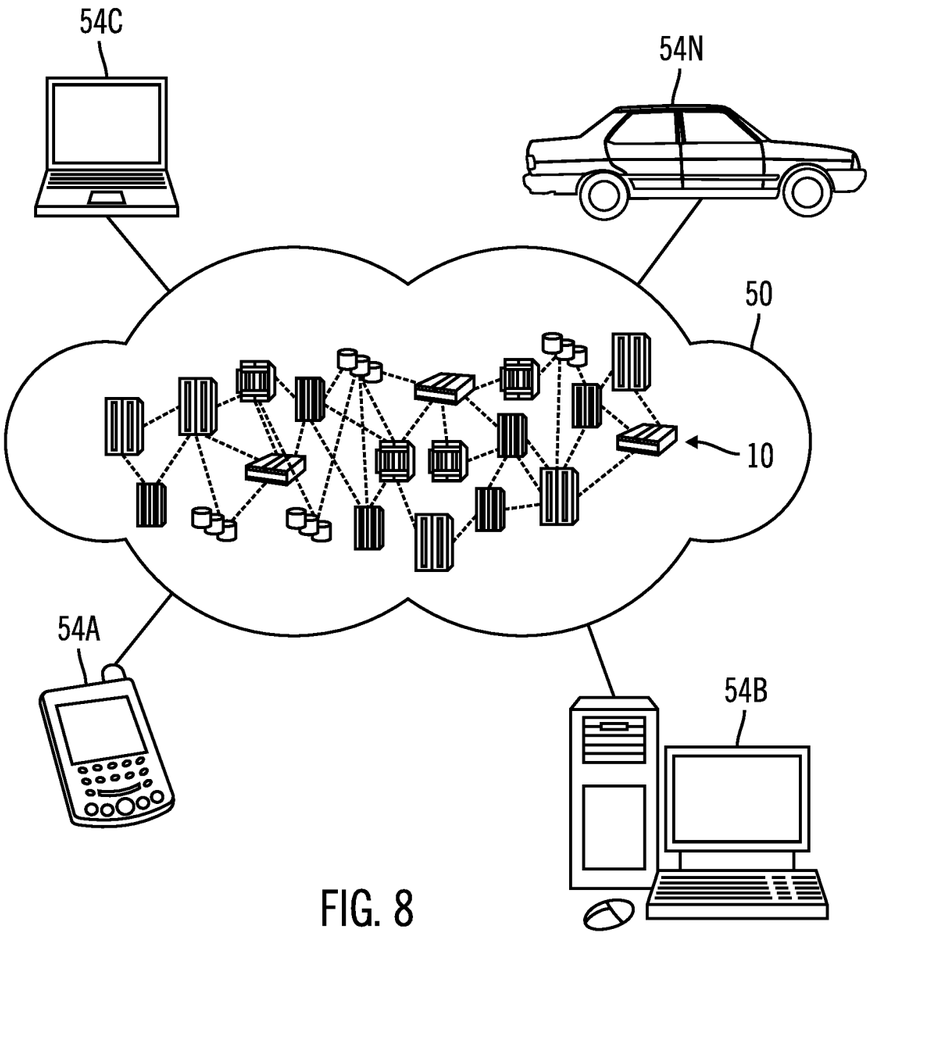
FIG. 8 illustrates a block diagram of a cloud computing environment, in accordance with certain embodiments.

Referring now to FIG. 8, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that cloud computing nodes 10 and cloud computing environment 50 can communicate with any type of computerized device over any type of network and/or network addressable connection (e.g., using a web browser).

Figure 9:
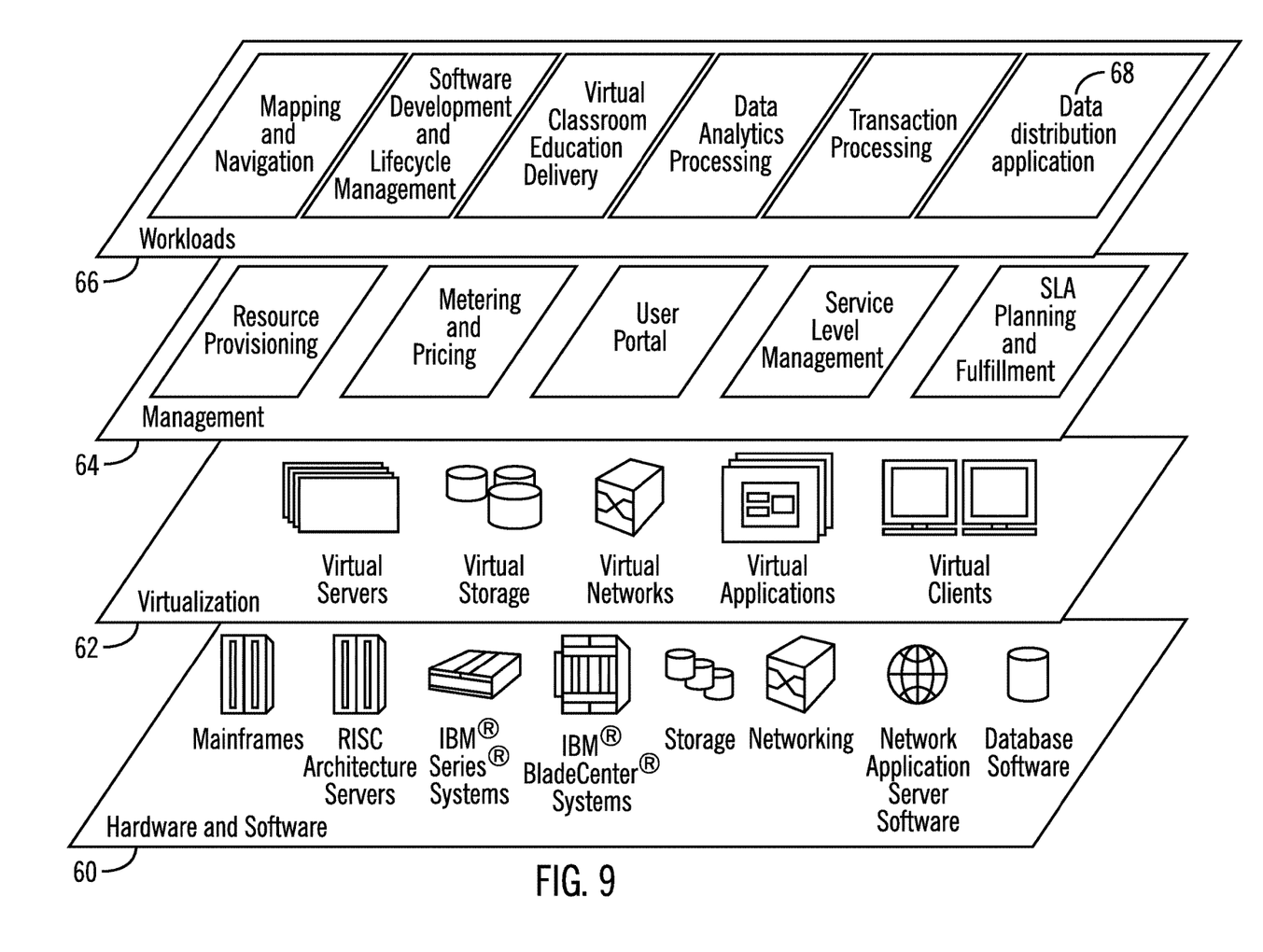
FIG. 9 illustrates a block diagram of further details of the cloud computing environment of FIG. 8, in accordance with certain embodiments.
Figure 10:
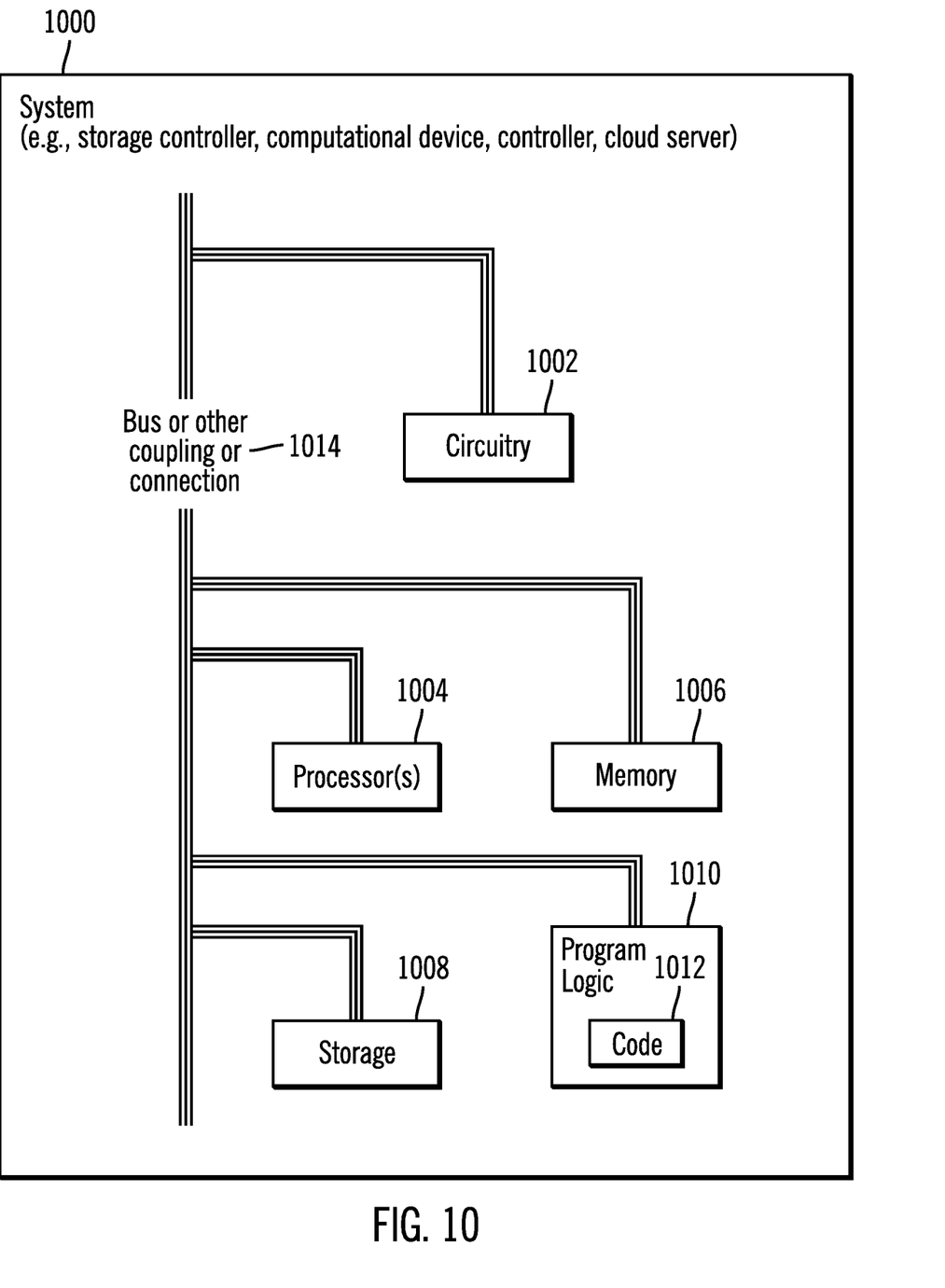
FIG. 10 illustrates a block diagram of a computational system that shows certain elements that may be included in the storage controller including servers shown in FIG. 1, in accordance with certain embodiments.

Referring now to FIG. 9, a set of functional abstraction layers provided by cloud computing environment 50 (FIG. 8) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the workload and functions provided by the data distribution application 124 (shown via reference numeral 68 in FIG. 10) as shown in FIGS. 1-9.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

FIG. 10 illustrates a block diagram that shows certain elements that may be included in the storage controller 102, the servers 110, 112, the hosts 106, 108 or other computational devices such as those in storage clouds 114, 116, 118, in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

maintaining metadata associated with data in a storage controller comprised of at least two servers that are configured to function redundantly and an interface to access a cloud storage comprised of a plurality of cloud servers provided by a plurality of different vendors and located in a plurality of geographical locations, wherein at least two different cloud servers provided by two different vendors execute two different operating systems, wherein the metadata includes a first field, a second field and a third field, wherein the first field comprises a list of geographical locations in which the data is allowed to be stored, wherein the second field comprises a list of geographical locations in which the data is not allowed to be stored, and wherein the third field comprises other policies on storage of the data including a predetermined date to which the data is allowed to be stored in a predetermined geographical location and entities that have access to the data, wherein the storage controller allows a plurality of host computational devices to perform input/output (I/O) operations with logical storage maintained by the storage controller, and wherein physical storage corresponding to the logical storage is maintained in the cloud storage;

maintaining, by the storage controller, a data structure that maintains the plurality of geographical locations of the plurality of cloud servers;

receiving, a request, by the storage controller from a task executing in a host computational device, to store the data in the cloud storage comprising the plurality of cloud servers located in the plurality of geographical locations;

determining, by the storage controller, by interpreting the first field, the second field and the third field of the metadata and the data structure that maintains the plurality of geographical locations of the cloud servers in which cloud server of the plurality of cloud servers to store the data in the cloud storage, wherein the determined cloud server is a first cloud server located in an allowed geographical location for the data, wherein a second cloud server is also located in an allowed geographical location for the data, and wherein a third cloud server is located in a geographical location that is not allowed for the data; and in response to determining by the storage controller that an asynchronous remote copy of the data stored in the first cloud server is to be performed, asynchronously copying, by the storage controller, the data from the first cloud server to the second cloud server but not to the third cloud server, wherein the storage controller that asynchronously copies the data from the first cloud server to the second cloud server but not to the third cloud server is a single storage controller that includes the interface to access the first cloud server, the second cloud server, and the third cloud server.

2. The method of claim 1, wherein the data is allowed by law to be stored only in one or more selected geographical locations, and wherein the law prohibits the data from crossing a national boundary, and wherein the policies further indicate that the data is allowed be stored in the predetermined geographical location for a predetermined period of time.

3. The method of claim 1, wherein selected data is initially stored in permitted geographical locations, and subsequently remote copy operations of the stored selected data are also made to permitted geographical locations based on indications stored in the metadata.

4. The method of claim 3, wherein the metadata indicates that health related data of an individual is stored in a country in which the individual resides.

5. The method of claim 4, wherein the metadata indicates that employee data is stored within a firewall of a corporation.

6. The method of claim 1, wherein there are restrictions on entities who can access the data and the restrictions dictate where the data is stored.

7. A system, comprising:

at least two servers that are configured to function redundantly;

an interface to access a cloud storage comprised of a plurality of cloud servers provided by a plurality of different vendors and located in a plurality of geographical locations, wherein at least two different cloud servers provided by two different vendors execute two different operating systems;

a memory; and a processor coupled to the memory, wherein the processor performs operations, the operations comprising:

maintaining metadata associated with data, wherein the metadata includes a first field, a second field and a third field, wherein the first field comprises a list of geographical locations in which the data is allowed to be stored, wherein the second field comprises a list of geographical locations in which the data is not allowed to be stored, and wherein the third field comprises other policies on storage of the data including a predetermined date to which the data is allowed to be stored in a predetermined geographical location and entities that have access to the data, wherein the system allows a plurality of host computational devices to perform input/output (I/O) operations with logical storage maintained by the system, and wherein physical storage corresponding to the logical storage is maintained in the cloud storage;

maintaining a data structure that maintains the plurality of geographical locations of the plurality of cloud servers;

receiving, a request from a task executing in a host computational device, to store the data in the cloud storage comprising the plurality of cloud servers located in the plurality of geographical locations;

determining, by interpreting the first field, the second field and the third field of the metadata and the data structure that maintains the plurality of geographical locations of the cloud servers in which cloud server of the plurality of cloud servers to store the data in the cloud storage, wherein the determined cloud server is a first cloud server located in an allowed geographical location for the data, wherein a second cloud server is also located in an allowed geographical location for the data, and wherein a third cloud server is located in a geographical location that is not allowed for the data; and in response to determining that an asynchronous remote copy of the data stored in the first cloud server is to be performed, asynchronously copying, the data from the first cloud server to the second cloud server but not to the third cloud server, wherein the system is a single storage controller that asynchronously copies the data from the first cloud server to the second cloud server but not to the third cloud server, and wherein the single storage controller includes the interface to access the first cloud server, the second cloud server, and the third cloud server.

8. The system of claim 7, wherein the data is allowed by law to be stored only in one or more selected geographical locations, and wherein the law prohibits the data from crossing a national boundary, and wherein the policies further indicate that the data is allowed be stored in the predetermined geographical location for a predetermined period of time.

9. The system of claim 7, wherein selected data is initially stored in permitted geographical locations, and subsequently remote copy operations of the stored selected data are also made to permitted geographical locations based on indications stored in the metadata.

10. The system of claim 9, wherein the metadata indicates that health related data of an individual is stored in a country in which the individual resides.

11. The system of claim 10, wherein the metadata indicates that employee data is stored within a firewall of a corporation.

12. The system of claim 7, wherein there are restrictions on entities who can access the data and the restrictions dictate where the data is stored.

13. A computer program product, the computer program product comprising a computer readable storage medium having computer readable program code embodied therewith, the computer readable program code configured to perform operations, the operations comprising:

maintaining metadata associated with data in a storage controller comprised of at least two servers that are configured to function redundantly and an interface to access a cloud storage comprised of a plurality of cloud servers provided by a plurality of different vendors and located in a plurality of geographical locations, wherein at least two different cloud servers provided by two different vendors execute two different operating systems, wherein the metadata includes a first field, a second field and a third field, wherein the first field comprises a list of geographical locations in which the data is allowed to be stored, wherein the second field comprises a list of geographical locations in which the data is not allowed to be stored, and wherein the third field comprises other policies on storage of the data including a predetermined date to which the data is allowed to be stored in a predetermined geographical location and entities that have access to the data, wherein the storage controller allows a plurality of host computational devices to perform input/output (I/O) operations with logical storage maintained by the storage controller, and wherein physical storage corresponding to the logical storage is maintained in the cloud storage;

maintaining, by the storage controller, a data structure that maintains the plurality of geographical locations of the plurality of cloud servers;

receiving, a request, by the storage controller from a task executing in a host computational device, to store the data in the cloud storage comprising the plurality of cloud servers located in the plurality of geographical locations;

determining, by the storage controller, by interpreting the first field, the second field and the third field of the metadata and the data structure that maintains the plurality of geographical locations of the cloud servers in which cloud server of the plurality of cloud servers to store the data in the cloud storage, wherein the determined cloud server is a first cloud server located in an allowed geographical location for the data, wherein a second cloud server is also located in an allowed geographical location for the data, and wherein a third cloud server is located in a geographical location that is not allowed for the data; and in response to determining by the storage controller that an asynchronous remote copy of the data stored in the first cloud server is to be performed, asynchronously copying, by the storage controller, the data from the first cloud server to the second cloud server but not to the third cloud server, wherein the storage controller that asynchronously copies the data from the first cloud server to the second cloud server but not to the third cloud server is a single storage controller that includes the interface to access the first cloud server, the second cloud server, and the third cloud server.

14. The computer program product of claim 13, wherein the data is allowed by law to be stored only in one or more selected geographical locations, and wherein the law prohibits the data from crossing a national boundary, and wherein the policies further indicate that the data is allowed be stored in the predetermined geographical location for a predetermined period of time.

15. The computer program product of claim 13, wherein selected data is initially stored in permitted geographical locations, and subsequently remote copy operations of the stored selected data are also made to permitted geographical locations based on indications stored in the metadata.

16. The computer program product of claim 15, wherein the metadata indicates that health related data of an individual is stored in a country in which the individual resides.

17. The computer program product of claim 16, wherein the metadata indicates that employee data is stored within a firewall of a corporation.

18. The computer program product of claim 13, wherein there are restrictions on entities who can access the data and the restrictions dictate where the data is stored.

* * * * *